Patented Aug. 19, 1930

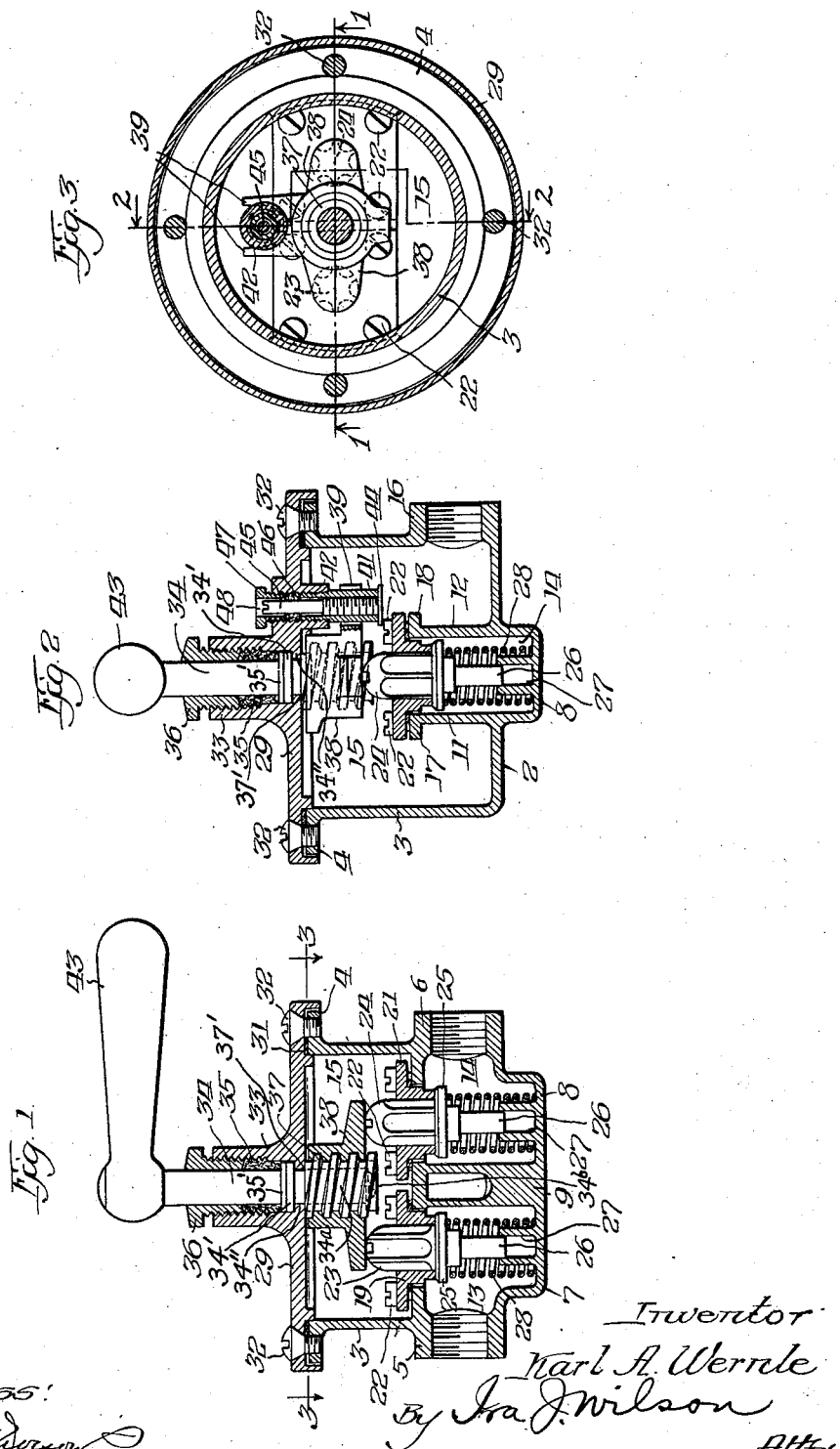

1,773,331

UNITED STATES PATENT OFFICE

KARL A. WERNLE, OF CHICAGO, ILLINOIS, ASSIGNOR TO JAMES B. CLOW & SONS, OF CHICAGO, ILLINOIS, A CORPORATION OF ILLINOIS

MIXING VALVE

Application filed November 3, 1927. Serial No. 230,719.

The invention hereinafter disclosed pertains to mixing valves of the character familiar in shower baths, hospital sinks, and wherever it is desired to mix hot and cold water to obtain water of the temperature desired.

Most mixing valves of the character generalized above have been of the type illustrated in Newton Patent 927,000 of July 6, 1909, in which the plungers controlling the amount and character of the water admitted are self-closing, or of that type illustrated in Niedecken Patent No. 1,001,431 of August 22, 1911, in which the control plungers are directly connected to a hand lever for manual operation. Of the two types the first, the self-closing plunger type, is, perhaps, the most certain and satisfactory in its operation for many reasons, but on the other hand presents numerous other difficulties, for instance in manufacture, repair and maintenance, which, so far as I am aware, have defied satisfactory solution.

One of the chief difficulties encountered with the self-closing type of mixing valve lies in the construction and arrangement of the several parts, which by reason of such construction and arrangement are more or less difficult to manufacture, assemble and repair and are almost inaccessible. Furthermore their construction has been such that one of the valve plungers used in this type has previously been arranged to open before the other and to close after the other, which very often resulted in leakage, due to the fact that the operator or the mechanism failed to permit the last shutting valve to close tightly, or possibly to the fact that one valve operating before the other wore one or the other or both of the valve plungers, or their seats, so that they would not tightly close when the instrument was shut off.

Accordingly it is a primary object of my invention to provide a valve of the self-closing plunger type which will overcome or obviate the difficulties of prior constructions including those defects or difficulties mentioned above, yet one which will be simple in construction and operation, cheap to manufacture, install and repair, and capable of long life under all conditions of use.

A further object of the invention is to provide a satisfactory arrangement whereby the rate or quantity of flow of water or the like from the mixing valve may be controlled and a maximum temperature of water at the outlet from the mixing valve regulated so that for given temperatures in the hot water or steam line and the cold water line, a predetermined water temperature and volume may be had at the outlet.

Further objects, as well as the advantages, the functions, and uses of my invention will be or should become clearly apparent after reading the following description and claims and after viewing the drawings in which:

Fig. 1 is a vertical sectional view through one form of valve embodying the invention taken on line 1—1 of Fig. 3, some parts being omitted, Fig. 2 is likewise a vertical sectional view of the valve taken at right angles to the view of Fig. 1, taken along line 2—2 of Fig. 3, and Fig. 3 is a transverse sectional view taken on the line 3—3 of Fig. 1.

A generally cup-shaped casing, having a bottom wall 2 and a substantially cylindrical side wall 3 terminating in an outwardly flanged circumferential lip 4, is provided with a boss 5 and a boss 6, each of which is tapped for connection to a water-supply pipe, the first for connection to a hot water line and the last for connection to a cold water line. Hollow bosses 7 and 8, divided by a partition 9 and provided with common side walls 11 and 12 project downwardly from the bottom wall 2 of the casing and upwardly therein, and together with the valve seats and plunger valves, to be described, divide the casing into three separate chambers 13, 14 and 15, the hot and cold water receiving chambers and the mixing chamber, respectively.

The casing is also provided with a boss 16 suitably tapped for the reception of an outlet pipe for passage of water from the mixing chamber 15. The walls 11 and 12 of the chambers 13 and 14 terminate at their upper ends in outwardly flanged portions 17 and 18 respectively and are provided with openings in which removable and replaceable valve seat members 19 and 21 are secured by means of cap screws 22 which pass into the flanges 17 and 18. The downwardly depending circumferential faces of the valve seat members form the seats against which plunger valves 23 and 24 seat.

The plunger valves are provided, as is usual, with differential grooves, the grooves in the hot water plunger extending to the top of the plunger but not to the bottom thereof and the grooves in the cold water plunger extending to the bottom thereof but not to the top. The plungers are adapted to slide up and down through the valve seat members 19, and 21 in operation, while a flange 25 on each carries a gasket or the like on its upper surface in order that water tight contact may be made with the valve seats and the lower end of each is provided with a cylindrical portion 26 adapted to be received in a cylindrical guide boss 27 upstanding from the central portion of the bottom wall of the bosses 7 and 8. A coiled spring 28 surrounds each projection 26 and each guide 27 and abuts at one end against the bottom wall of the bosses 7 and 8 and at its other end against the under side of the flanges 25.

A cover 29 closes the mouth of the casing and is secured thereto in any suitable manner in water-tight relation as by a gasket 31 and screws 32. A center portion of the casing on its outer or upper side is provided with a boss 33 through which a valve operating stem 34 projects and in which and about the valve stem 34 packing 35 may be placed and secured by packing gland nut 36. The valve stem 34 projects internally of the casing and at its inner end has a thrust screw 37 keyed or otherwise similarly secured to it. Preferably, however, the thrust screw is secured to the inner end of the stem by being slid over the squared end portion 34ª and secured thereto by a screw 34ᵇ in such manner that it may be removed. A thrust bar 38 is mounted upon and threadedly engaged with the screw 37. It will be noted that the stem is provided with an integral thrust collar 34' which bears at its lower side against a circumferential projection 34'' and which at its upper side engages a washer 35' placed between it and the packing 35. The thrust screw 37 finds a bearing at 37' against the underside of the cover 29, more particularly against the circumferential projection 34''. Thus pressure directed from the outside end toward the inner end of the stem 34 cannot affect the thrust bar 38 or the valve plungers, and all thrusts transmitted to the thrust screw from the valve plungers are absorbed by the bearing shoulder 37''. Furthermore, rotation of the stem will not affect the packing 35.

The thrust bar 38 is extended at one side to provide yoke arms 39 adapted to closely, but slidably, embrace a sleeve 41 threaded secured in an internally projecting boss 42 on the cover 29. In this manner, the thrust bar is prevented from rotating under the action of the thrust screw 37 when a handle 43 carried by the stem 34 is swung to open or close the valve.

In order to limit the extent of downward movement of the thrust bar and thereby control the temperature and output of the water from the outlet, the sleeve 41 is internally threaded for the reception of an adjustment screw having an outwardly flanged head 44 of sufficient diameter to permit it to engage the bottom surface of the yoke arms 39 in their downward movement. For the purpose of permitting adjustment of the adjustment screw, it is provided with a reduced unthreaded shank portion 45 which projects upwardly through the sleeve, the packing recess 46, and a stuffing box or packing gland nut 47, to the exterior of the cover whereby it may be adjusted by engagement of a screw driver in a slot 48. The end of the shank portion 45 may be terminated in any suitable fashion to be engaged by any suitable tool.

It will be noted that the thrust bar in the arrangement illustrated engages the top ends of the plunger valves simultanenously so that there could be little, if any, wobbling of the parts which would occur should the thrust bar engage one valve and then the other were my valve not otherwise constructed and arranged to prevent it. However, it is not necessary that the thrust bar engage the valves simultaneously or permit them so to close since the thrust bar is arranged with sufficient clearance at its upper limit of movement to permit the springs to return the valves tightly against their seats. It will also be apparent that when the cover 29 is removed, the valve seat members or either of them are accessible and may be removed without difficulty and that after the valve seat members have been removed or simultaneously with them, the plunger valves and springs likewise may be removed through the valve seat member openings which are made sufficiently wide to permit this to be done. The operation being clear from the foregoing, it will not be set forth in detail.

While I have shown and described a preferred embodiment of my invention, numerous changes of construction and arrangement may be made therein without departing from the spirit of the invention or the scope of the appended claims.

I claim:

1. In a mixing valve, a cup-shaped casing provided with independent inlet chambers in the bottom of the casing, a mixing chamber adjacent the mouth of the casing, an inlet for each inlet chamber, an opening from each inlet chamber to said mixing chamber and an outlet from said mixing chamber, a removable cover over the mouth of said casing, a valve seat member in each opening between the inlet and mixing chambers removable from and through the mouth of the casing and presenting seat surfaces directed away from the mixing chamber toward the bottom of the casing, a plurality of screws accessible from the mouth of the casing for securing each valve seat member in position, a plunger valve in each inlet chamber projecting into the mixing chamber through each seat member and seating against the seat surface of its respective seat member, a spring in each inlet chamber normally urging the plungers against their respective seat surfaces, a valve stem rotatably mounted through said cover, a thrust screw removably secured to the interior end of said stem, a thrust bar threadedly connected with said screw and engageable with the ends of said plungers in the mixing chamber, and means for securing said bar against rotation but permitting its movement longitudinally of said stem, whereby upon rotation of said stem in one direction said thrust bar will urge said plungers away from their seats against the action of said springs.

2. In a mixing valve, a substantially cup-shaped casing having a mixing chamber, a pair of hollow bosses having a common wall rising from the bottom of the casing into said mixing chamber and opening into the latter at their tops, each boss having an inlet port adjacent its bottom for connection to a water source and said casing having an outlet port from said mixing chamber, a valve seat member over the opening of each boss removable from and through the mouth of said casing and presenting a downwardly directed seat surface interior of each boss, means for removably and independently securing said members to said bosses, a plunger valve in each boss having a seat cooperative with the seat surface of its respective seat member and projecting upwardly into said mixing chamber, the maximum diameter of said plungers being less than the diameter of the opening into the mixing chamber of their respective bosses, spring means, removable through said boss openings into the mixing chamber, below said plungers and normally urging them upward against their seats, a removable cover over the mouth of said mixing chamber, means interior of said cover for moving said plungers from their seats, means projecting through said cover for operating said plunger moving means, and adjustable means for limiting the extent of opening of said plungers comprising an internally threaded sleeve projecting inwardly of said cover and secured thereto in alignment with an opening therethrough to the exterior, a screw member having a head of a diameter greater than the diameter of said sleeve and a shank having a threaded and an unthreaded portion threadedly engaged by its threaded portion with the threads of said sleeve, said head being at the interior end of said sleeve and said unthreaded portion being of less diameter than the interior diameter of said sleeve and projecting through said cover to the exterior thereof, a packing gland in a packing recess about the said unthreaded portion on the exterior of said cover, and a yoke secured to said thrust bar embracing said sleeve and adapted to contact with said head at the end of its movement in one direction, said unthreaded portion of the screw member having a slot in its outwardly disposed end.

3. In a valve, a casing, a valve therein, a stem extending into said casing for controlling said valve and provided with a thrust bar operable in accordance with the operation of said valve by said stem, and a threaded member carried by said casing extending thereinto beyond said thrust bar adjustable from the exterior of the casing and provided with a stop for limiting the inward movement of the thrust bar.

4. In a mixing valve, a casing providing inlet and outlet ports and a mixing chamber, plunger valves in said casing between said inlet and outlet ports and operable from the interior of said mixing chamber, said casing having an opening to said mixing chamber, a valve operating stem rotatably mounted through said opening with an end projecting into said chamber, a thrust screw secured to said end of said stem for rotation therewith, said thrust screw bearing against an interior portion of said casing about said opening, a thrust bar threadedly connected with said screw and engageable with the ends of said plungers in the mixing chamber, and means for securing said bar against rotation.

5. In a mixing valve, a cup-shaped casing providing inlet and outlet ports and a mixing chamber, said mixing chamber being adjacent the mouth of the casing, a cover for the mouth of the casing, said cover having a valve stem opening therethrough, plunger valves in said casing between said inlet and outlet ports and operable from the interior of the mixing chamber, a valve operating stem having one end disposed through said opening, a thrust shoulder in said cover about said opening, a thrust screw secured to said end of said stem and adapted to bear against said shoulder, a packing gland about said stem, a thrust bar threadedly connected with said screw and engageable with the ends of said plungers in the mixing chamber, and means for securing said bar against rotation.

6. In a mixing valve, a casing providing inlet and outlet ports and a mixing chamber, said mixing chamber being adjacent the top of the casing, a cover for the top of the casing, said cover having a valve stem opening therethrough and a packing recess about said opening, said recess providing a circumferential shoulder about said opening, plunger valves in said casing between said inlet and outlet ports and operable from the interior of the mixing chamber, a valve operating stem having one end disposed through said opening, a thrust collar secured to said stem and engaged with said circumferential shoulder within said packing recess, a thrust screw secured to said end of said stem and engaging said circumferential shoulder at the inner side of said cover, a thrust bar threadedly engaged with said thrust screw and engageable with the ends of said plungers in the mixing chamber, and means for securing said bar against rotation.

In witness of the foregoing I affix my signature.

KARL A. WERNLE.